Aug. 1, 1967  J. R. CLAYCOMB  3,333,459
RELEASABLE COUPLER AND TUBULAR TESTING APPARATUS
Filed March 9, 1965  4 Sheets-Sheet 1

JACKSON R. CLAYCOMB
INVENTOR.

by Bernard Kriegel
ATTORNEY.

Aug. 1, 1967    J. R. CLAYCOMB    3,333,459
RELEASABLE COUPLER AND TUBULAR TESTING APPARATUS
Filed March 9, 1965    4 Sheets-Sheet 3

JACKSON R. CLAYCOMB
INVENTOR.

by Bernard Kriegel
ATTORNEY.

United States Patent Office 3,333,459
Patented Aug. 1, 1967

3,333,459
RELEASABLE COUPLER AND TUBULAR TESTING APPARATUS
Jackson R. Claycomb, Houston, Tex., assignor to Baker Oil Tools, Inc., City of Commerce, Calif., a corporation of California
Filed Mar. 9, 1965, Ser. No. 438,185
16 Claims. (Cl. 73—40.5)

ABSTRACT OF THE DISCLOSURE

Apparatus for testing tubing for leaks, particularly tubing located in a well bore, which can be placed in self-supporting condition in the tubing and released hydraulically from the tubing prior to hydraulic expansion of upper and lower packing structures against the tubing to seal off a test zone therein, after which a valve is opened hydraulically to enable pressure fluid to be directed to the test zone. The apparatus also includes a hydraulically operated coupler disconnectible at pressures within a certain range, but which remains connected at lower and higher pressures outside of such range.

---

The present invention relates to subsurface well bore equipment, and more particularly to hydraulically operable coupling and testing apparatus adapted to be used within a well bore or a tubular string disposed in the well bore. The apparatus can find employment in other environments than the ones specifically identified.

An object of the invention is to provide a tubing tester for ascertaining the presence of leaks in a tubing string, or the like, in which the tubing tester can be self supporting in the tubing string, thereby avoiding the need for removing it therefrom following a testing operation, or any need for its remaining connected to and supported by an associated device.

A further object of the invention is to provide a tubing string tester that will not damage the inner wall of the tubing string, or any coating thereon.

Another object of the invention is to provide a tubing string tester capable of being moved longitudinally within a tubing string by a hydraulic line through which fluid pressure can be applied through the tester, obviating the need for its movement by other mechanisms, such as a wire line connected to it and extending to the top of the well bore in which the tubing string is disposed.

An additional object of the invention is to provide a fluid pressure operated coupling device particularly adaptable for connection to subsurface well apparatus, such as a tubing tester, which is releasable upon application of pressure thereto in a predetermined range, but which cannot be released on application of fluid pressures thereto outside of such range, as pressures above the predetermined range.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings.

Figures 1, 5:
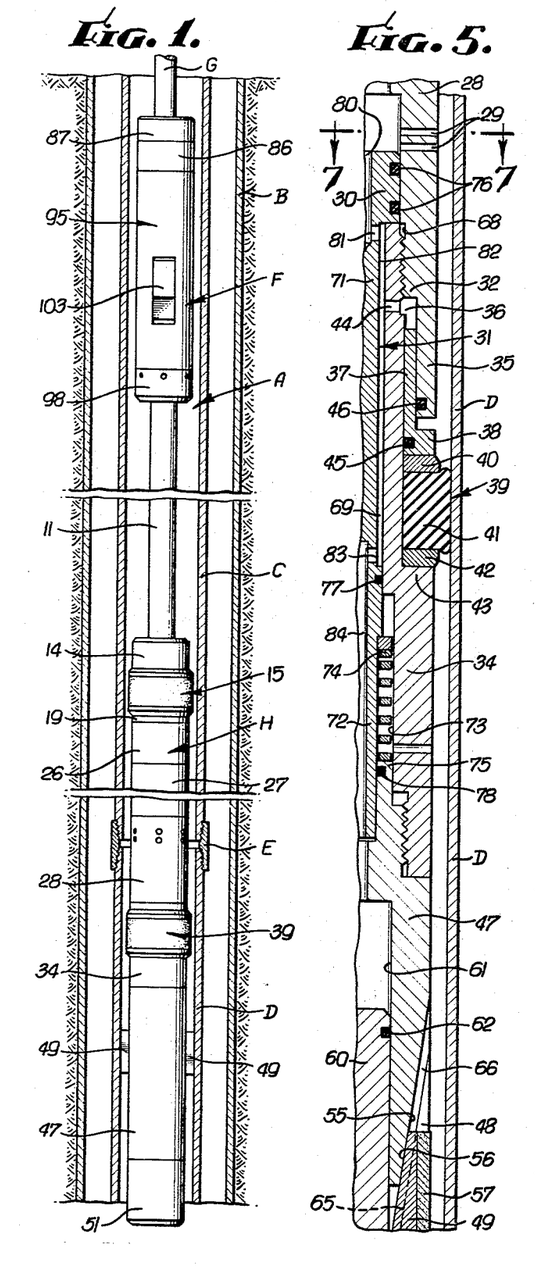
FIGURE 1 is a side elevational view of a tubing string tester and associated device coupled thereto, disposed within a tubing string located in a casing string positioned in a well bore.
FIG. 5 is an enlarged quarter sectional view of a portion of the tubing tester apparatus disposed in packed-off condition in the tubing string and with its testing ports open for the application of fluid pressure to the tubing string.

In the specific application of the hydraulically releasable coupler and tubular testing apparatus disclosed in the drawings, it is desired to pressure test predetermined lengths of a tubing string A as it is being lowered within or withdrawn from a well casing B disposed in a well bore. As shown more particularly in FIG. 1, the tubing string includes a plurality of sections C, D secured to one another by coupling E. Such tubing string may be or is intended to be operatively associated with a lower tool (not shown) disposed in a well casing, such as well packer adapted to be anchored in packed-off condition in the casing. The tubing tester apparatus will ordinarily be used within the section or sections of the tubing string at the top of the well bore and, for that matter, within a portion of a tubing string that might even extend above the upper end of the casing string, the section to be tested at any one time varying, for example, from several feet to several hundred feet, depending upon the particular length subtended by the testing apparatus.

The apparatus illustrated in the drawings includes a hydraulically releasable coupler device F connected to the lower end of tubing G that may be of relatively small diameter and which may be flexible so that it can be coiled on or uncoiled from a reel (not shown) disposed at the top of the well bore. The releasable coupler is releasably connected to the upper portion of the tubing tester H, the fluid pressure for testing passing downwardly through the tubing G and through the coupler F into the tubing tester H.

The tubing tester includes a body structure 10 of several different parts fastened to one another and extending the entire length of the tester apparatus. The body structure includes an upper latch, coupling device or receiver 11 having an upper latch head 12, the lower end of the receiver being threadedly secured to an upper tubular body 13 having an upper head or flange portion 14 abutting the upper end of an upper packing structure 15 surrounding the body. As disclosed, such packing structure includes an upper gauge ring 16 contacting the upper flange, a normally retracted packing element 17, of rubber or rubber-like material, abutting against the upper gauge ringe, and a lower gauge ring 18 contacting the lower end of the element 17. The lower end of the ring 18 engages the upper piston flange 19 of an annular piston 20 slidable along and surrounding the upper body 13, and disposed within an annular cylinder space 21 defined between the body and an upper cylinder 22 threadedly secured to the lower end of the body 13. The upper end of the cylinder 22 is disposed adjacent to the piston flange 19 when the upper packing element 17 is in retracted position. Fluid under pressure from within the upper body 13 can pass through one or more body side ports 23 into the annular cylinder space 21 below the piston 20, leakage of fluid in an upward direction along the piston being prevented by a suitable seal ring 24 mounted in the piston flange portion and sealingly engaging the upper body, and by a side seal ring 25 mounted in the upper cylinder skirt 26 and sealingly engaging the periphery of the annular piston.

The lower portion of the upper cylinder 22 is threadedly secured to the upper end of a body spacer 27 that can be of any desired length and which may actually comprise several sections of tubing connected to one another directly or through intervening couplings (not shown). As an example, the body spacer may vary anywhere from a few feet in length to several hundred feet in length. Its lower end is threadedly secured to the upper end of a valve body 28 having a plurality of side ports 29 extending through its wall which are adapted to be closed by the upper valve head portion 30 of a slidable valve member 31 mounted therewithin. The valve body 28 is integral with a lower cylinder 32 depending therefrom which is threadedly secured to the upper end of a lower body 34, the lower cylinder including a cylinder skirt 35 spaced laterally from the lower body to provide a lower annular cylinder space 36 in which a lower piston 37 is slidable, this lower piston terminating in a lower outwardly directed flange 38 engaging the upper end of a lower packing structure 39. Such structure includes a gauge ring 40 engaged by the piston, which, in turn, engages the upper end of a lower normally retracted packing element 41, of rubber or rubber-like material. The lower end of the packing element engages a lower gauge ring 42 resting upon an upwardly facing lower body shoulder 43, the gauge rings and packing element surrounding the lower body above the shoulder 43. Fluid under pressure within the lower body 34 passes through one or more body side ports 44 into the annular cylinder space 36 to shift the lower piston 37 downwardly for the purpose of expanding the packing element 41 outwardly against the wall of the tubing string A. Leakage of fluid in a downward direction along the lower piston is prevented by a seal ring 45 mounted in its flange and slidably sealing against the periphery of the lower body 34, and by a side seal ring 46 mounted in the cylinder skirt 35 and engaging the periphery of the lower piston above its flange 38.

The lower end of the lower body 34 is threadedly secured to the upper portion of a slip expander and retractor 47 having opposed longitudinally extending grooves 48 therein, in which slips 49 are located. The lower portion of the slip expander and retractor has an enlarged internal diameter 50 and is threadedly attached to a body housing 51 adapted to contain a slip expanding helical compression spring 52, the lower end of which bears upon an end wall 53 of the housing that has an axial port 54 therethrough to allow passage of fluids between the interior of the housing and its exterior.

The slip expander and retractor 47 has the base portion 55 of its grooves tapered or inclined in a downward and inward direction, which are engageable with companion tapered inner surfaces 56 on the pair of opposed slips 49 mounted in the grooves, these slips having friction shoes 57 suitably secured to their exteriors and forming a part thereof. The pair of slips 49 are movable longitudinally together and radially into and from engagement with the wall of the well tubing. Their joint longitudinal movement is effected by a coupling pin 58 secured to each slip and slidable in a transverse bore or hole 59 extending through a slip retracting and expanding piston 60 slidable longitudinally within a bore 61 in the slip expander and retractor, which also functions as a cylinder for the piston. Leakage of fluid between the piston and the wall of the cylinder is prevented by a suitable seal ring 62 on the piston slidably and sealingly engaging the cylinder wall.

The piston 60 is urged upwardly within the slip expander and retractor 47 by a thrust member 63 engaged by the upper end of the slip expanding spring 52, the thrust member having a central spring centering portion 64 extending into the upper portion of the spring. The spring 52 normally urges the thrust member and piston upwardly, so as to shift the slips 49 upwardly along the tapered expander surfaces 55 and expand them radially outwardly into engagement with the wall of the tubing string A. When hydraulic pressure is imposed on the fluid in the cylinder 61 sufficient to overcome the compressive force of the helical spring 52, the piston 60 moves downwardly to shift the slips 49 downwardly in the slip expander and retractor grooves 48, the slips moving inwardly by virtue of the provision of side tongues 65 on each slip slidable within companion grooves 66 opening into the sides of each expander groove, the tongue and groove interconnection being inclined to the same extent and in the same direction as the inclined base or expander surfaces 55 of the slip expander. Thus, it is apparent that the spring 52 normally tends to expand the slips 49 outwardly against the wall of the tubing string A; whereas, the application of sufficient fluid pressure in the slip expander cylinder 61 overcomes the force of the spring and effects retraction of the slips from the wall of the tubing string.

The upper valve head 30 is slidable along the wall 68 of the valve body 28 between a closed position across the body ports 29 and a lower position opening the body ports. The wall 68 of the valve body has a greater internal diameter than the inner wall 69 of the lower body 34 along which a lower valve head 70 is slidable, the upper and lower valve heads being integrated to one another through an intervening valve rod portion 71 which is spaced from the inner wall 69 of the lower body. A tubular valve portion 72 depends from the lower valve head 70 and is slidable within the upper end of the slip expander and retractor 47, this tubular portion 72 being in spaced relation to the lower valve body 34 to provide an annular space 73 in which a helical compression valve spring 74 is disposed, the lower end of the valve spring engaging the upper end 75 of the slip expander and retractor, which forms a lower spring seat therefor, and its upper end engaging the lower valve head 70 so as to urge the internal slidable valve device 31 in an upward direction to dispose the upper valve head 30 in closed position across the ports 29. When in such closed position, leakage of fluid past the periphery of the valve head is prevented by side seal rings 76 mounted on the upper valve head and located on opposite sides of the valve body ports 29. Leakage of fluid along the periphery of the lower valve head is prevented by a side seal ring 77 thereon slidably and sealingly engaging the inner walls of the lower body, whereas leakage of fluid along the tubular rod portion 72 of the valve member is prevented by a suitable side seal ring 78 on the upper portion of the slip expander sleeve sealingly engaging the periphery of the tubular valve stem portion 72.

Fluid under pressure within a central passage 79 of the latch receiver 11 can pass downwardly therefrom into the upper body 13, flowing through the upper body ports 23 into the upper cylinder space 21 for action upon the upper piston 20. Such fluid under pressure can continue downwardly through the upper cylinder 22 and the body spacer 27 into the valve body 28, acting in a downward direction upon the upper valve head 30, which has a greater diameter than the lower valve head 70. The upper valve head has a central passage 80 therein into which the fluid from the valve body 28 can flow, the fluid then passing through side ports 81 in the valve member below its upper head 30 into an annular space 82 between the intervening valve rod portion 71 and the valve body below the head and the lower body, such fluid passing through such annular space into the side ports 44 in the lower body communicating with the lower cylinder space 36, the fluid acting downwardly on the lower piston 37. The fluid from the annular space 82 can then flow through side ports 83 immediately above the lower valve head 70 to a central passage 84 through the hollow valve member portion 72, and into the lower slip expander cylinder 61 for downward action upon the slip retracting piston 60 slidably mounted in the expander cylinder.

Fluid is prevented from being trapped within the valve spring annular space by one or more bleeder ports in the lower body communicating with the lower portion of the spring space and with the exterior of the lower body. Fluid is prevented from being trapped in the lower spring housing by its ability to pass through the axial port in the lower end of the latter.

It is apparent that the fluid under pressure imposed within the tester apparatus can act simultaneously on the upper and lower pistons 20, 37, as well as upon the valve head 30 and slip retracting piston 60. However, the valve spring 74 exerts sufficient force on the valve member 31 as to retain it in its upper port closing position, until after the packing elements 17, 41 have been expanded into firm sealing engagement with the wall of the tubing string A. The fluid pressure within the apparatus will move the slip retracting piston 60 downwardly against the force of its spring 52 to retract the slips 49 from the wall of the tubing before sufficient fluid pressure can be built up in the apparatus to shift the upper and lower pistons 20, 37 within their cylinders to shorten the upper and lower packing elements 17, 41 and expand them outwardly against the wall of the tubing string. In other words, as the fluid pressure in the apparatus increases, it will first move the slip retracting piston 60 downwardly to retract the slips 49 from the wall of the tubing, after which the fluid pressure will move the upper piston 20 upwardly and the lower piston 37 downwardly to shorten and compress the packing elements 17, 41 into sealing engagement with the wall of the tubing string, followed by a further increase in fluid pressure shifting the valve head 30 downwardly to open the ports 29, so that the fluid pressure can pass outwardly through the ports into the annular space around the tester between the upper and lower expanded packing elements, for the purpose of testing the length of the tubing string straddled by the upper and lower packing elements 17, 41.

The hydraulically releasable coupler F is releasably connected to the upper latch receiver 11, and also functions as a conduit through which fluid under pressure can pass from the macaroni, or other, tubing G into the tester apparatus H. The lower end of the tubing G is threadedly connected to the upper portion of a low pressure cylinder 86 that may have a suitable collar 87 threaded on its upper portion. The lower portion of the low pressure cylinder is threadedly secured to the upper end of a high pressure cylinder 88 that is integral with a lower annular cylinder head 89 extending toward a piston rod portion 90 of a low pressure piston 91, which has an upper piston head 92 slidable along an upper cylinder wall 93 of the low pressure cylinder, upward movement of the low pressure piston within the cylinder being limited by its engagement with a downwardly facing cylinder shoulder 94.

The high pressure cylinder 88 actually forms part of an elongate coupler body 95 that has an intermediate bore 96 in which the lower portion of the piston rod 90 is slidable, this bore opening into an enlarged bore 97, or counterbore, that can receive the latch head 12 of the tester receiver 11. The lower portion of the coupler body 95 is threadedly secured to a guide 98 having a downwardly flaring mouth or entry portion 99 for facilitating emplacement of the body over the latch head 12 and latch receiver 11, the guide having a plurality of radial ports 100 extending therethrough for preventing fluids from being trapped in the apparatus F during its movement onto and from the latch receiver.

The lower end of the low pressure piston rod 90 has a nose portion 101 projected into the body counterbore 97 and its end is engageable with an inwardly projecting finger 102 of a latch lever 103 disposed within an elongate slot 104 in the body, the lever being mounted upon a pivot pin 105 extending across the slot and suitably secured to the body. The lever 103 has a lower leg portion 106 depending from its pivot pin 105 which terminates in an inwardly directed latch dog or finger 107 adapted to move into a circumferential groove 108 in the latch head 12 of the tester, the upper end 109 of the finger being tapered in an upward and inward direction so as to coact with a companion upper undercut side 110 of the latch head to prevent inadvertent outward shifting of the latch dog from the latch head groove. The lower end 111 of the latch finger is also tapered or inclined in an upward or inward direction for engaging the tapered upper end 112 of the latch head for the purpose of shifting the latch finger or dog 107 in a lateral outward direction as the latch lever moves over the latch head 112.

The latch lever 103 also includes an arm portion 113 extending upwardly from the pivot pin and forming a bell-crank type of lever with the inwardly projecting finger 102 of the latch lever. A helical compression spring 114 is disposed between the upper portion of the arm 113 and the base of the groove 104 so as to tend to urge the arm in a lateral outward direction, the leg 106 and its latch dog 107 in a lateral inward direction, and the lever finger 102 in an upward direction, the finger thereby tending to shift the piston rod 90 and entire piston 91 upwardly to the extent limited by engagement of the piston head 92 with the low pressure cylinder shoulder 94.

The piston rod 90 and cylinder skirt 115 of the high pressure cylinder 88 form an annular space 116 in which an anular high pressure piston 117 is slidable. This piston includes a lower annular piston head 118 slidable along the wall of the high pressure cylinder skirt 115 and along the piston rod 90, there being a high pressure piston skirt 119 extending upwardly from the head and terminating adjacent to the low pressure piston head 92. The piston skirt 119 is spaced from the cylinder skirt 115, defining a spring chamber 120 in which a helical compression spring 121 can be confined, the lower end of which engages the high pressure piston head 118 and the upper end of which engages the lower end of the low pressure cylinder 86. Thus, the spring 121 tends to shift the high pressure piston 117 to a downward position, limited by engagement of the high pressure piston head 118 with the high pressure cylinder head 89, which will lower the upper end of the piston skirt from the low pressure head 92 and permit the low pressure piston 117 to move downwardly within the low pressure cylinder, which need only occur to a relatively short extent.

Figure 2:
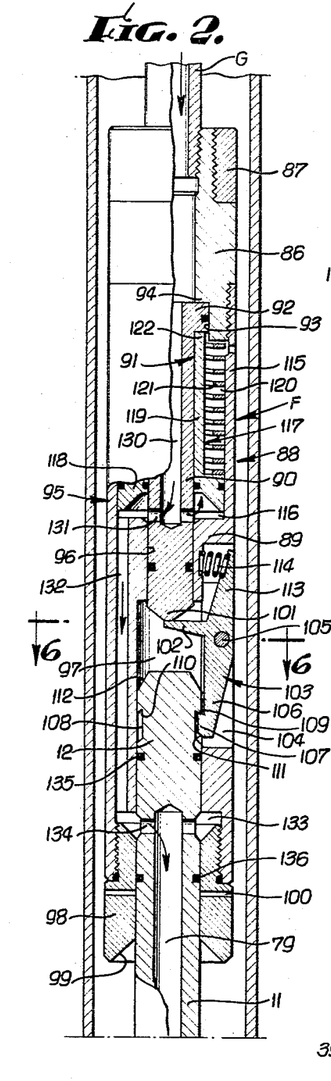
FIGS. 2, 2a and 2b together constitute the combined side elevational and longitudinal sectional view through the apparatus disclosed in FIG. 1, on an enlarged scale, the apparatus being in condition to be moved longitudinally in the tubing string, FIGS. 2a and 2b being lower continuations of FIGS. 2 and 2a, respectively.
Figure 2A:
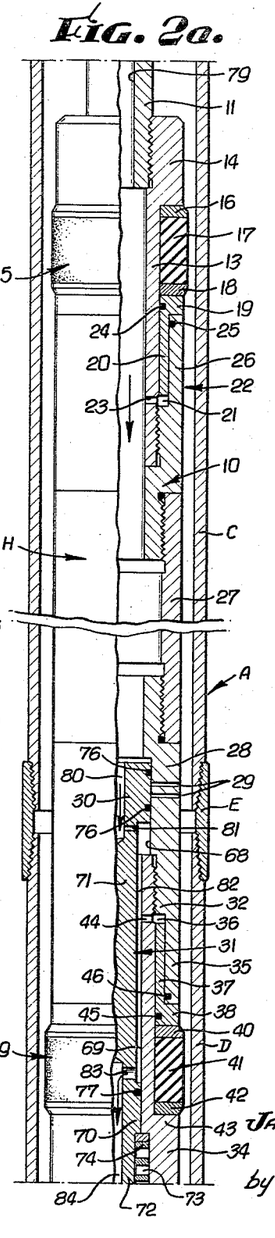
Figure 2B:
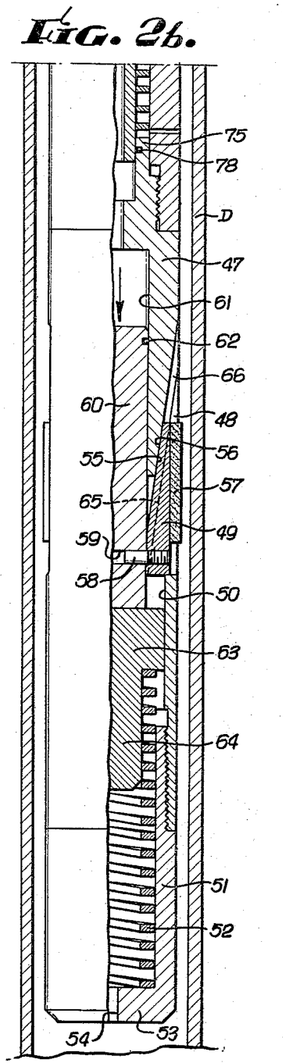
Figure 3:
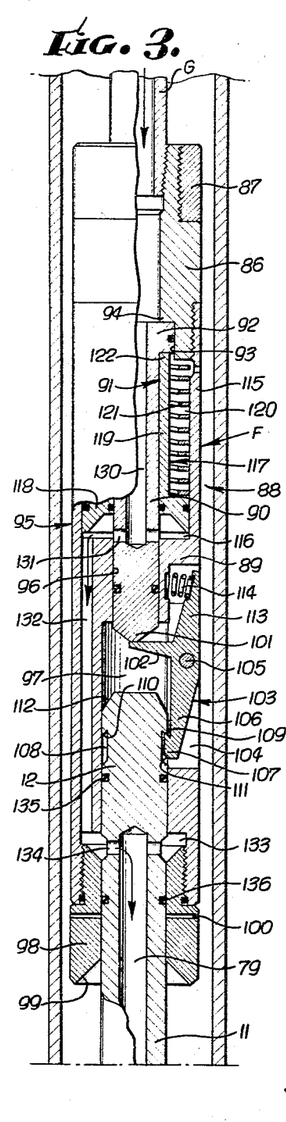
FIGS. 3, 3a and 3b are used corresponding to FIGS. 2, 2a and 2b illustrating the apparatus in the condition for performing a pressure test within the tubing string, FIGS. 3a and 3b, being lower continuations of FIGS. 3 and 3a, respectively.
Figure 3A:
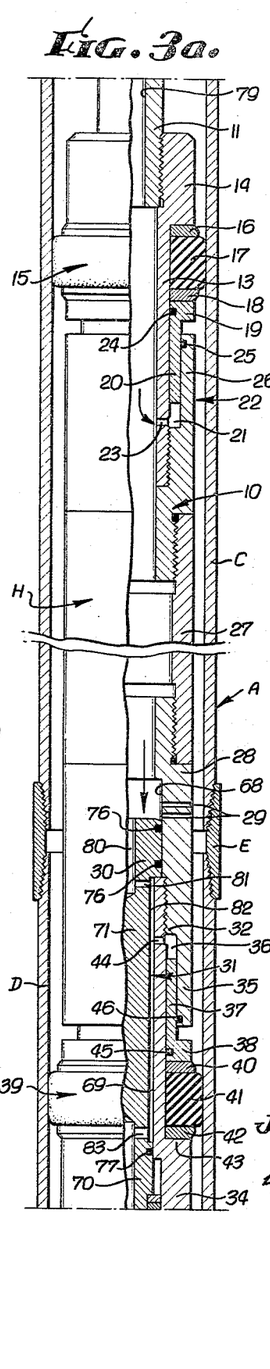
Figure 3B:
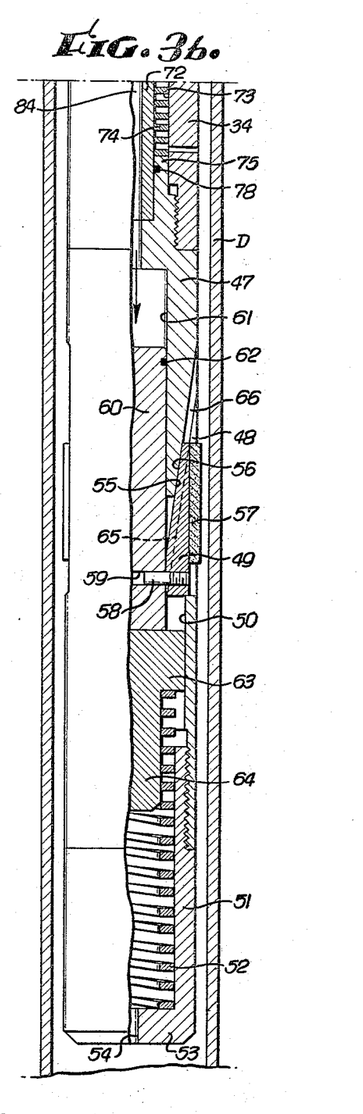
Figure 4:
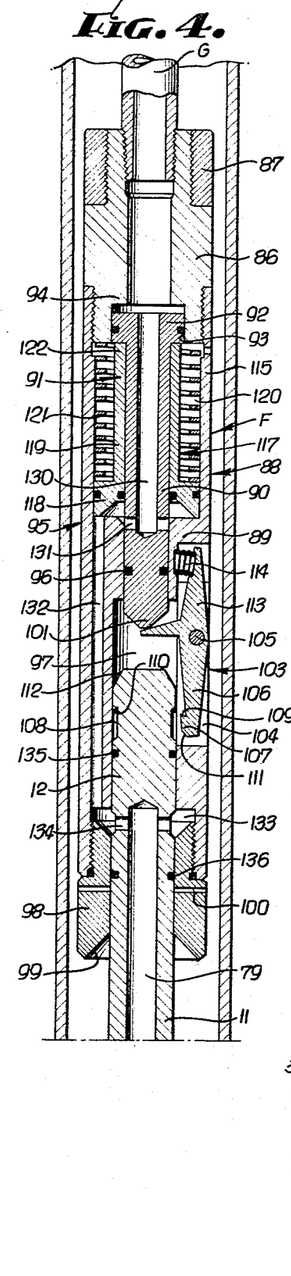
FIGS. 4, 4a and 4b are views similar to FIGS. 2, 2a and 2b illustrating the upper hydraulic coupler disconnected from the apparatus and the tubing tester portion of the apparatus supported in the tubing string, FIGS. 4a and 4b being lower continuations of FIGS. 4 and 4a, respectively.
Figure 4A:
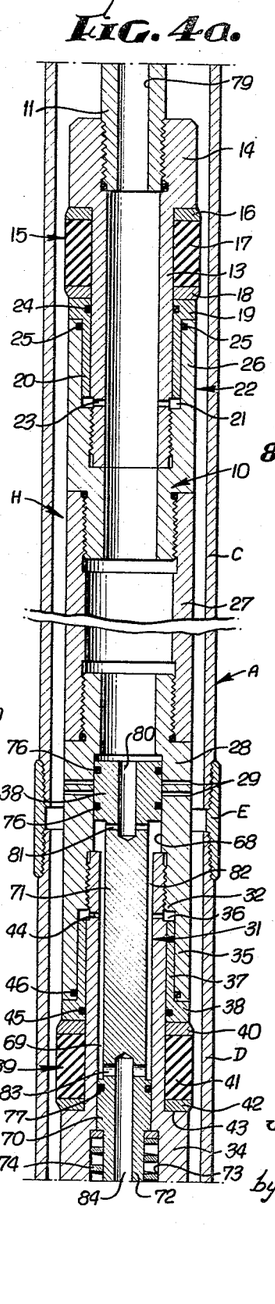
Figure 4B:
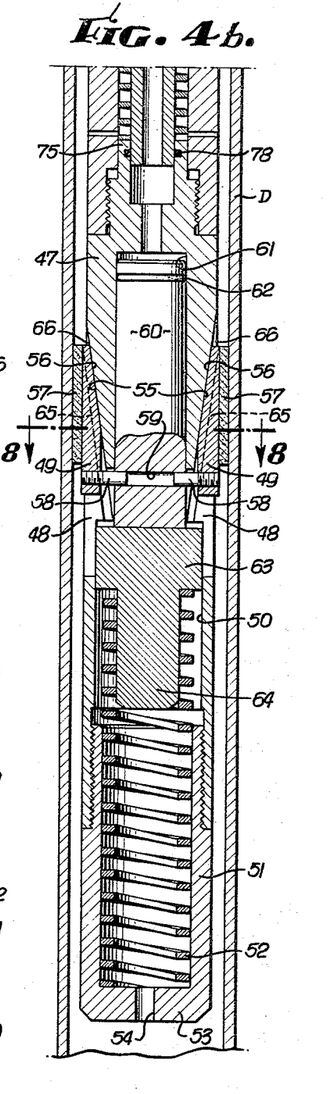
Figure 6:
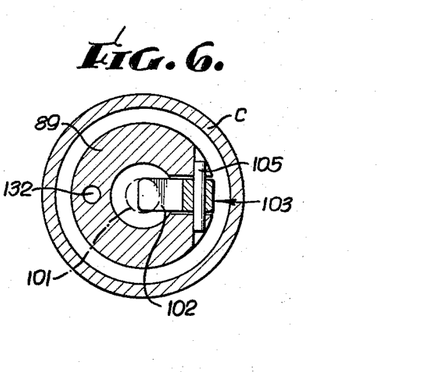
FIG. 6 is a section taken along the lines 6—6 on FIG. 2.
Figure 7:
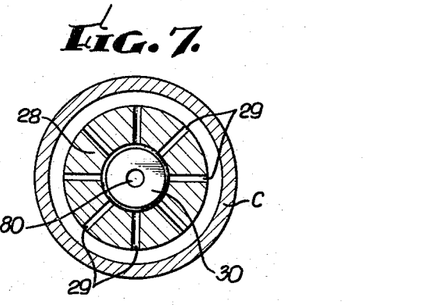
FIG. 7 is a section taken along the line 7—7 on FIG. 5.
Figure 8:
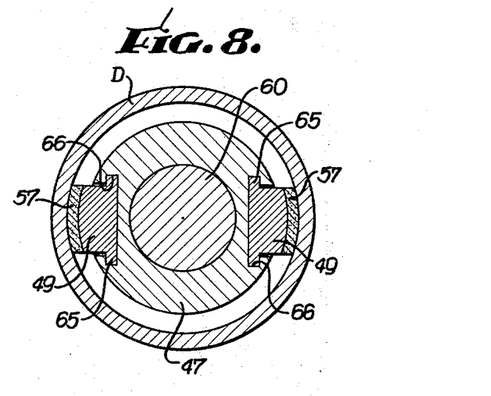
FIG. 8 is a section taken along the line 8—8 on FIG. 4b.

When the high pressure piston 117 is in its lower position within the high pressure cylinder 88, the low pressure piston 91 can be shifted downwardly hydraulically within the low pressure cylinder 86 to swing the finger 102 downwardly against the force of the lever spring 114, and shift the latch dog 107 outwardly from the latch head groove 108 (FIG. 4). However, when sufficient hydraulic pressure is within the lower portion of the high pressure cylinder 116, it will shift the high pressure piston 117 upwardly against the force of the spring 121 to hold the low pressure piston 91 in its upward position, allowing the lever spring 114 to retain the latch dog or finger 107 within the latch groove 108 (FIGS. 2, 3).

The hydraulic pressure for acting upon the low pressure piston 91 is present within the low pressure cylinder 86, and this hydraulic pressure can also pass through a central passage 130 in the low pressure piston that communicates with a plurality of ports 131 opening into the lower portion of the high pressure cylinder 88 for upward action against the high pressure piston 117. The fluid from the high pressure cylinder 88 can also flow through a longitudinal passage 132 in the body 95 into a lower threaded counterbore 133 of the latter that receives the upper end of the guide 98, the fluid then flowing through a plurality of side ports 134 within the latch receiver 11 and into the central passage 79 in the latter and into the upper body 13 of the tester. When the latch body 95 and its guide 98 are disposed over the latch receiver 11, spaced seal rings 135, 136 on the latch receiver on opposite sides of its ports 134 sealingly engage the wall of the guide 98 and the wall of the body 95 to prevent leakage of fluids in both an upward and downward direction along the exterior of the latch receiver portion of the tester. At this time, the bleeder ports 100 of the guide are disposed below the lower seal ring 136.

The force exerted by the latch spring 114 and the effective area of the low pressure piston 91 are such, as compared to the force exerted by the high pressure cylinder spring 121 and the area of the high pressure piston 117, that the imposition of a relatively low pressure within the hydraulic connector device F can overcome the force of the latch spring 114 and move the low pressure piston 91 downwardly in its cylinder 86, and, through the lever finger 102, shift the latch dog 107 in a lateral outward direction, the high pressure spring 121 retaining the high pressure piston 117 in a downward direction. However, a sufficient increase in the fluid pressure will cause it to act over the greater area of the high pressure piston head 118 and overcome the force of its companion spring 121, shifting the piston 117 upwardly to move and hold the low pressure piston 91 upwardly within its cylinder, so that the arm spring 114 can act on the lever 103 and shift the latch dog 107 to its lateral inward position.

As an example, it may be assumed that the lever spring 114 exerts sufficient force to retain the latch dog 107 in its inward position, and that such spring force will be overcome when about 100 p.s.i. fluid pressure is imposed in the connector apparatus F. Pressures from about 100 to 300 p.s.i. can shift and hold the low pressure piston 91 downwardly, its downward movement causing it to swing the finger 102 in a downward direction against the force of the lever spring 114 in order to shift or hold the latch dog 107 in its lateral outward or uncoupling position. The pressures referred to above are insufficient to act upon the high pressure piston 117 and shift it upwardly against the force of its helical compression spring 121. However, when the pressure exceeds 300 p.s.i., the force of the high pressure piston spring 121 will be overcome and the high pressure piston will start moving upwardly, compressing the spring 121 and pushing the low pressure piston 91 back up to its original position, allowing the latch lever spring 114 to retract the latch lever dog 107 to its lateral and inward position. Thus, in the assumed example, the latch lever 103 can only be held in its released position by pressures ranging from about 100 to about 300 p.s.i. Pressures above this range will cause the high pressure piston 117 to hold the low pressure piston 91 in its upper and ineffective position, allowing the spring 114 to shift the latch lever back to its original position, wherein it can be or remains coupled to the latch head of the latching receiver. Pressures below 100 p.s.i. cannot overcome the force of the spring 114.

The combination of hydraulically operated connector and tubing tester apparatus F, H can be used in a variety of ways for testing a tubular string, such as tubing string, disposed within a wall casing located in a well bore. In the particular use illustrated in the drawings, let it be assumed that it is desired to test a length of the tubing string A that may include one or more couplings E. The connector device F is moved over the latch receiver 11 until the latch finger 107 snaps into the locking groove 108 in the latch head. At this time, the slip expanding spring 52 is acting through its thrust member 63 and the slip retracting piston 60 to shift and hold the slips 49 upwardly along the slip expander 47, or in their expanded position. The valve head 30 is closing the ports 29, and the upper and lower packing structures 15, 39 are in their retracted positions.

Before the tester apparatus can be moved into and downwardly within the tubing string, it is necessary to retract the slips 49. Accordingly, fluid pressure is imposed on the apparatus through the tubing G that has previously been connected to its upper end. As the pressure increases, the low pressure piston 91 is first moved downwardly, to swing the latch lever dog 107 outwardly, but the coupler will remain in proper relation to the latch receiver, since the coupler F and tester apparatus H are prevented from separating longitudinally from one another at the top of the well bore by the operating personnel. As the pressure increases, the high pressure piston 117 is shifted upwardly, to move the low pressure piston 91 back to an ineffective position, the latch lever again swinging inwardly to relocate its latch dog 107 within the groove 108. The provision of the undercut 110 in the upper side of the latch head groove 108 and the companion inclination of the upper end 109 of the latch finger 107 can prevent the low pressure piston 91 from swinging the latch lever 103 to its released position if sufficient separating force exists on the connector body 95 and the latch receiver 11, it then being necessary to allow the connector body 95 and latch lever 103 to shift downwardly to a small extent along the latch head 12 before the latch dog or finger 107 can be swung outwardly from the latch head groove 108. In any event, as described above, since the connector and tester apparatus F, H are being held together, an increase in pressure to a sufficient extent will cause the high pressure piston 117 to move upwardly within the high pressure cylinder 88 and shift the low pressure piston 91 upwardly to its ineffective position, the latch dog 107 then being held by the lever spring 114 in coupled relation to the latch head 12 by remaining in its groove 108.

As the fluid pressure continues to increase, it will act on the slip retracting piston 60 and overcome the force of the slip spring 52, shifting downwardly within the slip expander 47 and moving the slips 49 downwardly of the expander and inwardly to retracted position. The pressure required to retract the slips 49 is less than the pressure required to expand the packing elements 17, 41 outwardly against the tubing string A, and, as described above, much less than the pressure required to shift the valve head 30 downwardly to its port open position. The apparatus can now be lowered in the tubing string A on the tubing G until the upper and lower packings 17, 41 are in their desired location straddling a particular length of the tubing string, including one or more couplings E. As the fluid pressure increases to a further extent, the upper piston 20 is moved upwardly in its cylinder and the lower piston 37 downwardly in its cylinder to shorten and compress the packing elements 17, 41 and expand them into firm sealing engagement with the wall of the tubing, as well as against the peripheries of the upper and lower bodies 13, 34. As the pressure is further increased, the force of the valve spring 74 is overcome and the upper valve head 30 moves downwardly to open the ports 29, the fluid pressure then passing outwardly of the valve body into the annular space between the upper and lower expanded packing elements 17, 41 and the tester body 10 and wall of the tubing A. A sufficient pressure can be applied to determine the presence of any leaks in the length of tubing between the upper and lower packing elements, including the one or more couplings E that may be subtended thereby.

The pressure can then be relieved, which will cause the valve spring 74 to shift the valve head 30 back up to its port closing position, the packing elements 17, 41 to retract inherently from the tubing wall, and the slip spring 52 to shift upwardly to move the slips 49 along the slip expander 47 and outwardly to bring their shoes 57 into frictional engagement with the wall of the tubing string. The pressure can be decreased until the high pressure spring 121 shifts the high pressure piston 117 downwardly to its ineffective position, allowing the low pressure piston 91 to shift downwardly and swing the finger 102 downwardly and the latch dog or finger 107 laterally from coupling relation to the latch head 12, permitting the tubing G to be elevated and move the connector F off the latch head, the connector then being removable from the tubing string A, if desired. Since the slips 49 frictionally engage the tubing wall, they will support the tubing tester H in the tubing string A.

With the coupler F and tubing G removed from the tubing string A in the well bore, an additional length of tubing can be secured to that previously disposed in the well bore and the tubing and whatever tool or other device connected to its lower end then lowered to a further extent within the well casing B, the tubing tester H, of course, moving downwardly with it. The connector or coupler F can then be lowered by means of its tubing G down through the newly added length of the tubing string, its guide 98 and body 95 being disposed over the latch receiver 11, and the latch finger 107 snapping downwardly over the head 12 and back into the groove 108, the latch head 12 then being in the position illustrated in FIG. 2, except that the high pressure piston 117 is being held in its lower position by its companion spring 121. The fluid under pressure can then be imposed on the coupler F and the tubing tester H through the tubing G, the fluid pressure being increased above the range in which the low pressure piston 91 is effective to release the latch lever 103, and up to a value at which the slip retractor piston 60 moves downwardly and retracts the slips 49 from the tubing string A. This pressure value is insufficient to expand the packing elements 17, 41. The apparatus F, H can now be elevated to carry the tester upwardly within the newly added length of tubing so as to straddle an upper part of the tubing therebelow and a desired portion of the added length to be tested. With the tester H in its new location within the tubing string A, the fluid pressure can be increased to an extent greater than that required to retain the slips 49 retracted, the fluid pressure passing downwardly through the coupler and into the tubing tester to shift the pistons 20, 37 and expand the upper and lower packing elements 17, 41 against the tubing, and to then shift the valve head 30 downwardly and open the ports 29 so that the tubing region between the upper and lower packing elements 17, 41 can be tested for leaks.

The pressure can again be relieved, the valve head 30 moving back to its port closing position under the influence of its associated spring 74, the packing elements moving inherently back to their retracted positions, and the slip spring 52 moving the thrust member 63 and slip retracting piston 60 upwardly to reexpand the slips 49 against the wall of the tubing A, for the purpose of supporting the tester. The pressure in the effective range of the low pressure coupler piston 91 can then be imposed upon the apparatus so that such piston moves downwardly to shift the latch lever leg 106 laterally outwardly to remove the dog 107 from the groove 108, allowing the tubing G to be elevated from the latch receiver 11 and the entire tubing tester H, and again removed from the tubing string A.

The foregoing cycle of operation can be repeated as additional lengths of tubing are added to the tubing string.

The tubing tester H is also effective for testing the tubing string as it is being withdrawn from the well casing. The hydraulic coupler F and tubing tester are run in the tubing string, after pressure has been applied thereto to retract the slips 49, to a desired distance below the top of the well bore and the tubing string tested by causing the upper and lower packing structures 15, 39 to seal off against the wall of the tubing string and the valve 31 to shift to open position. Sufficient pressure is imposed upon the slip retracting piston 60 to shift or retain the slips in retracted position, and the combination of apparatus lowered in the tubing string by an amount that will correspond to the length of tubing string to be elevated above the top of the well casing. The pressure is then relieved so that the slips 49 expand against the tubing wall to support the tester H therewithin, the pressure being reduced to the required range for releasing the coupler F from the tubing tester, which, in the example given above, can be from about 100 p.s.i. to 300 p.s.i. The tubing G and coupler F are then removed from the tester H and withdrawn from the tubing string A at the top of the hole. The tubing string A is then elevated from the hole and the required length above the location of the tester therewithin unthreaded from the tubing string therebelow. The coupler F is then run in the tubing string and is reconnected to the tubing tester H, sufficient pressure being applied to retract the slips 49, whereupon the tubing tester can be lowered by means of the coupler F and the macaroni tubing G in the tubing string to the required extent, and another pressure test of the tubing string performed. The pressure in the apparatus is reduced so that the slips 49 again are expanded outwardly by the spring 52 to support the tester. The coupler F is released from the latch receiver head 12, the macaroni tubing G and connector F then being withdrawn from the tubing string A, whereupon the latter can be elevated and the upper portion of the tubing string disconnected from the portion remaining in the well casing therebelow.

The foregoing cycle of operation can be repeated as often as desired, and, for that matter, to an extent sufficient to test the entire length of tubing string initially disposed in the well bore, prior to its withdrawal from the latter.

It is, accordingly, apparent that a tubing tester, or the like, has been provided that is easily useable for testing for leaks in the tubing string, both during lowering of the tubing string in the well bore and during its retrieval therefrom. The tubing tester H can remain in the tubing string A by being supported from the latter without requiring any other devices to support it, and it can be moved within the tubing string by the macaroni, or other, tubing G and the associated hydraulic releasable coupler F that is used for applying pressure to it in connection with operation of the tester and the application of pressure to the tubing string itself in effecting the test. The support of the tester H in the well casing occurs through use of the slips 49, and the like, that are devoid of teeth, and which will, therefore, not damage the wall of the tubing string or of any protective coating that might have been applied thereto. The coupler device F is actuated easily and hydraulically, and despite its hydraulic actuation, it will only operate within a desired range of pressures, so that the coupling connection with the tubing tester H remains despite the application of comparatively high pressures to both the hydraulic releasable coupler device and the tubing tester.

I claim:

1. In apparatus for testing pipe and connectible to tubing to be moved by the tubing longitudinally in the pipe: body means movable longitudinally in the pipe; longitudinally spaced packing structures on said body means expandible laterally outwardly into sealing engagement with the pipe and retractable from the pipe; said body means having passage means for receiving fluid from the tubing, said passage means having an outlet from said body means between said packing structures; supporting means on said body means for gripping the pipe to support the apparatus therein; means for shifting said supporting means against the pipe; fluid operated means responsive to fluid pressure in said passage means of a first value for retracting said supporting means from the pipe; means for shifting said packing structures between expanded and retracted conditions comprising fluid operated means responsive to fluid pressure in said passage means of a second value higher than said first value; and valve means normally closing said outlet and shiftable to open position in response to fluid pressure in said passage means of a third value higher than said second value.

2. In apparatus connectible to tubing to be moved by the tubing longitudinally in the pipe: body means movable longitudinally in the pipe, said body means having passage means for receiving fluid from the tubing, said passage means having an outlet into the pipe; means on said body means for gripping the pipe to support the apparatus therein; means for shifting said gripping means against the pipe; fluid operated means responsive to fluid pressure in said passage means of a first value for retracting said gripping means from the pipe; and valve means normally closing said outlet and shiftable to open position in response to fluid pressure in said passage means of a second value higher than said first value.

3. In apparatus for testing pipe and connectible to tubing to be moved by the tubing longitudinally in the pipe: body means movable longitudinally in the pipe; longitudinally spaced normally retracted packing structures on said body means expandable laterally outwardly into sealing engagement with the pipe, said body means having passage means for receiving fluid from the tubing, said passage means having an outlet from said body means between said packing structures; supporting means on said body means for gripping the pipe to support the apparatus therein; means for shifting said supporting means against the pipe; fluid operated means responsive to fluid pressure in said passage means of a first value for retracting said supporting means from the pipe; fluid operated means responsive to fluid pressure in said passage means of a second value higher than said first value for expanding said packing structure against the pipe; and valve means normally closing said outlet and shifted to open position in response to fluid pressure in said passage means of a third value higher than said second value.

4. In apparatus for testing pipe and connectible to tubing to be moved by the tubing longitudinally in the pipe: body means movable longitudinally in the pipe; longitudinally spaced packing structures on said body means adapted to seal against the pipe; said body means having passage means for receiving fluid from the tubing, said passage means having an outlet from said body means between said packing structures; supporting means on said body means for gripping the pipe to support the apparatus therein; means for shifting said supporting means against the pipe; fluid operated means responsive to fluid pressure in said passage means of a first value for retracting said supporting means from the pipe; and valve means normally closing said outlet and shifted to open position in response to fluid pressure in said passage means of a second value higher than said first value.

5. In apparatus for testing pipe and connectible to tubing to be moved by the tubing longitudinally in the pipe: body means movable longitudinally in the pipe; longitudinally spaced packing structures on said body means expandable laterally outwardly into sealing engagement with the pipe and retractable from the pipe; said body means having passage means for receiving fluid from the tubing, said passage means having an outlet for said body means between said packing structures; expander means on said body means; slip means engaging said expander means; spring means engaging said slip means for shifting said slip means in one direction along said expander means and against the pipe; fluid-operated means responsive to fluid pressure in said passage means of a first value for shifting said slip means in the opposite direction to retracted position; means for shifting said packing structures between expanded and retracted conditions comprising fluid operated means responsive to fluid pressure in said passage means of a second value higher than said first value; and valve means normally closing said outlet and shiftable to open position in response to fluid pressure in said passage means of a third value higher than said second value.

6. In apparatus connectible to tubing to be moved by the tubing longitudinally in the pipe: body means movable longitudinally in the pipe and having passage means for receiving fluid from the tubing, said passage means having an outlet into the pipe; expander means on said body means; slip means engaging said expander means; spring means engaging said slip means for shifting said slip means in one direction along said expander means and against the pipe; fluid operated means responsive to fluid pressure in said passage means of a first value for shifting said slip means in the opposite direction to retracted position; and valve means normally closing said outlet and shiftable to open position in response to fluid pressure in said passage means of a second value higher than said first value.

7. In apparatus for testing pipe and connectible to tubing to be moved by the tubing longitudinally in the pipe: body means movable longitudinally in the pipe; longitudinally spaced normally retracted packing structures on said body means expandable laterally outwardly into sealing engagement with the pipe; said body means having passage means for receiving fluid from the tubing, said passage means having an outlet from said body means between said packing structures; expander means on said body means; slip means engaging said expander means; spring means engaging said slip means for shifting said slip means in one direction along said expander means and against the pipe; fluid operated means responsive to fluid pressure in said passage means of a first value for shifting said slip means in the opposite direction to retracted position; fluid operated means responsive to fluid pressure in said passage means of a second value higher than said first value for expanding said packing structures against the pipe; and valve means normally closing said outlet and shifted to open position in response to fluid pressure in said passage means of a third value higher than said second value.

8. In apparatus for testing pipe and movable therein by tubing: a testing device movable in the pipe and including first coupling means, spaced packing means for sealing against the pipe, and a first fluid passageway opening into the pipe between said packing means; a coupler attachable to the tubing and having second coupling means connectible to said first coupling means to secure said coupler to said testing device; said coupler having a second fluid passageway communicable with the tubing and communicating with said first fluid passageway when said first and second coupling means are connected to each other; and fluid operated means responsive to fluid pressure in one of said passageways for releasing one of said coupling means from the other of said coupling means.

9. In apparatus for testing pipe and movable therein by tubing: a testing device movable in the pipe and including first coupling means, spaced packing means for sealing against the pipe, and a first fluid passageway opening into the pipe between said packing means; a coupler attachable to the tubing and having second coupling means connectible to said first coupling means to secure said coupler to said testing device; said coupler having a second fluid passageway communicable with the tubing and communicating with said first fluid passageway when said first and second coupling means are connected to each other; and fluid operated means responsive to fluid pressure in said second passageway for releasing said second coupling means from said first coupling means.

10. In apparatus for testing pipe and movable therein by tubing: a testing device movable in the pipe and including first coupling means, spaced packing means for sealing against the pipe, and a first fluid passageway opening into the pipe between said packing means; a coupler attachable to the tubing and having second coupling means connectible to said first coupling means to secure said coupler to said testing device; said coupler having a second fluid passageway communicable with the tubing and communicating with said first fluid passageway when said first and second coupling means are connected to each other; first fluid operated means responsive to fluid pressure in one of said passageways of a first value for releasing one of said coupling means from the other of said coupling means; and second fluid operated means responsive to fluid pressure in one of said passageways of a second value higher than said first value for retaining said first fluid operated means in ineffective position.

11. In apparatus for testing pipe and movable therein by tubing: a testing device movable in the pipe and including first coupling means, spaced packing means for sealing against the pipe, and a first fluid passageway opening into the pipe between said packing means; a coupler attachable to the tubing and having second coupling means connectible to said first coupling means to secure said coupler to said testing device; said coupler having a second fluid passageway communicable with the tubing and communicating with said first fluid passageway when said first and second coupling means are connected to each other; said coupler including a first cylinder and a second cylinder, both cylinders communicating with said second fluid passageway; first piston means in said first cylinder and engaging said second coupling means to release said second coupling means from said first coupling means in response to fluid pressure in said second fluid passageway of a first value; and second piston means in said second cylinder engaging said first piston means to retain said first piston means in ineffective position in response to fluid pressure in said second fluid passageway of a second value higher than said first value.

12. In apparatus for testing pipe and movable therein by tubing: body means moving longitudinally in the pipe and having first coupling means at its upper portion; longitudinally spaced packing structures on said body means expandable laterally outwardly into sealing engagement with the pipe and retractable from the pipe; said body means having first passage means for receiving fluid from the tubing, said passage means having an outlet from said body means between said packing structures; supporting means on said body means for gripping the pipe to support the apparatus therein; means for shifting said supporting means against the pipe; fluid operated means responsive to fluid pressure in said passage means of a first value for retracting said supporting means from the pipe; means for shifting said packing structures between expanded and retracted conditions comprising fluid operated means responsive to fluid pressure in said passage means of a second value higher than said first value; valve means normally closing said outlet and shiftable to open position in response to fluid pressure in said passage means of a third value higher than said second value; a coupler attachable to the tubing and having second coupling means connectible to said first coupling means to secure said coupler to said body means; said coupler having second fluid passage means communicable with the tubing and communicating with said first fluid passage means when said first and second coupling means are connected with each other; and fluid operated means responsive to fluid pressure in one of said passage means of a fourth value less than said first value for releasing one of said coupling means from the other of said coupling means.

13. In apparatus for testing pipe and movable therein by tubing: body means movable longitudinally in the pipe and having first coupling means at its upper portion; longitudinally spaced normally retracted packing structures on said body means expandible laterally outwardly into sealing engagement with the pipe; said body means having first passage means for receiving fluid from the tubing, said passage means having an outlet from said body means between said packing structures; supporting means on said body means for gripping the pipe to support the apparatus therein; means for shifting said supporting means against the pipe; fluid operated means responsive to fluid pressure in said passage means of a first value for retracting said supporting means from the pipe; fluid operated means responsive to fluid pressure in said passage means of a second value higher than said first value for expanding said packing structures against the pipe; valve means normally closing said outlet and shiftable to open position in response to fluid pressure in said passage means of a third value higher than said second value; a coupler attachable to the tubing and having second coupling means connectible to said first coupling means to secure said coupler to said body means; said coupler having second fluid passage means communicable with the tubing and communicating with said first passage means when said first and second coupling means are connected to each other; and fluid operated means responsive to fluid pressure in said second passage means of a fourth value less than said first value for releasing said second coupling means from said first coupling means.

14. In apparatus for testing pipe and movable therein by tubing: body means movable longitudinally in the pipe and having first coupling means at its upper portion; longitudinally spaced normally retracted packing structures on said body means expandible laterally outwardly into sealing engagement with the pipe; said body means having first passage means for receiving fluid from the tubing, said passage means having an outlet from said body means between said packing structures; supporting means on said body means for gripping the pipe to support the apparatus therein; means for shifting said supporting means against the pipe; fluid operated means responsive to fluid pressure in said passage means for a first value for retracting said supporting means from the pipe; fluid operated means responsive to fluid pressure in said passage means of a second value higher that said first value for expanding said packing structures against the pipe; valve means normally closing said outlet and shiftable to open position in response to fluid pressure in said passage means of a third value higher that said second value; a coupler attachable to the tubing and having second coupling means connectible to said first coupling means to secure said coupler to said body means; said coupler having second fluid passage means communicable with the tubing and communicating with said first passage means when said first and second coupling means are connected to each other; said coupler including a first cylinder and a second cylinder, both cylinders communicating with said second fluid passage means; first piston means in said first cylinder and engaging said second coupling means to release said second coupling means from said first coupling means in response to fluid pressure in said second passage means of a fourth value less than said first value; and second piston means in said second cylinder engaging said first piston means to retain said first piston means in ineffective position in response to fluid pressure in said second passage means of a value higher than said fourth value.

15. In a coupler adapted to be releasably connected to a companion tool having a coupling member thereon; said coupler including body means having a fluid passageway; coupling means on said body means connectible to the coupling member; first fluid operated means responsive to fluid pressure in said passageway of a first value for releasing said coupling means from the coupler member; and second fluid operated means responsive to fluid pressure in said passageway of a second value higher than said first value for retaining said first fluid operated means in ineffective position.

16. In a coupler adapted to be releasably connected to a companion tool having a coupling member thereon; said coupler including body means having a first cylinder and a second cylinder and a fluid passageway communicating with said cylinders; coupling means on said body means connectible to the coupling member; first piston means in said first cylinder and engaging said coupling means to release said coupling means from the coupling member in response to fluid pressure in said fluid passageway of a first value; and second piston means in said second cylinder engaging said first piston means to retain said first piston means in ineffective position in response to fluid pressure in said passageway of a second value higher than said first value.

References Cited

UNITED STATES PATENTS

| | | | |
|---|---|---|---|
| 2,887,124 | 5/1959 | Mehl | 285—306 XR |
| 2,946,388 | 7/1960 | Evans | 166—120 |
| 2,953,919 | 9/1960 | Potts | 73—40.5 XR |
| 3,048,998 | 8/1962 | Gilbreath | 73—40.5 |

LOUIS R. PRINCE, *Primary Examiner.*

J. NOLTON, *Assistant Examiner.*